Figures 1, 2:
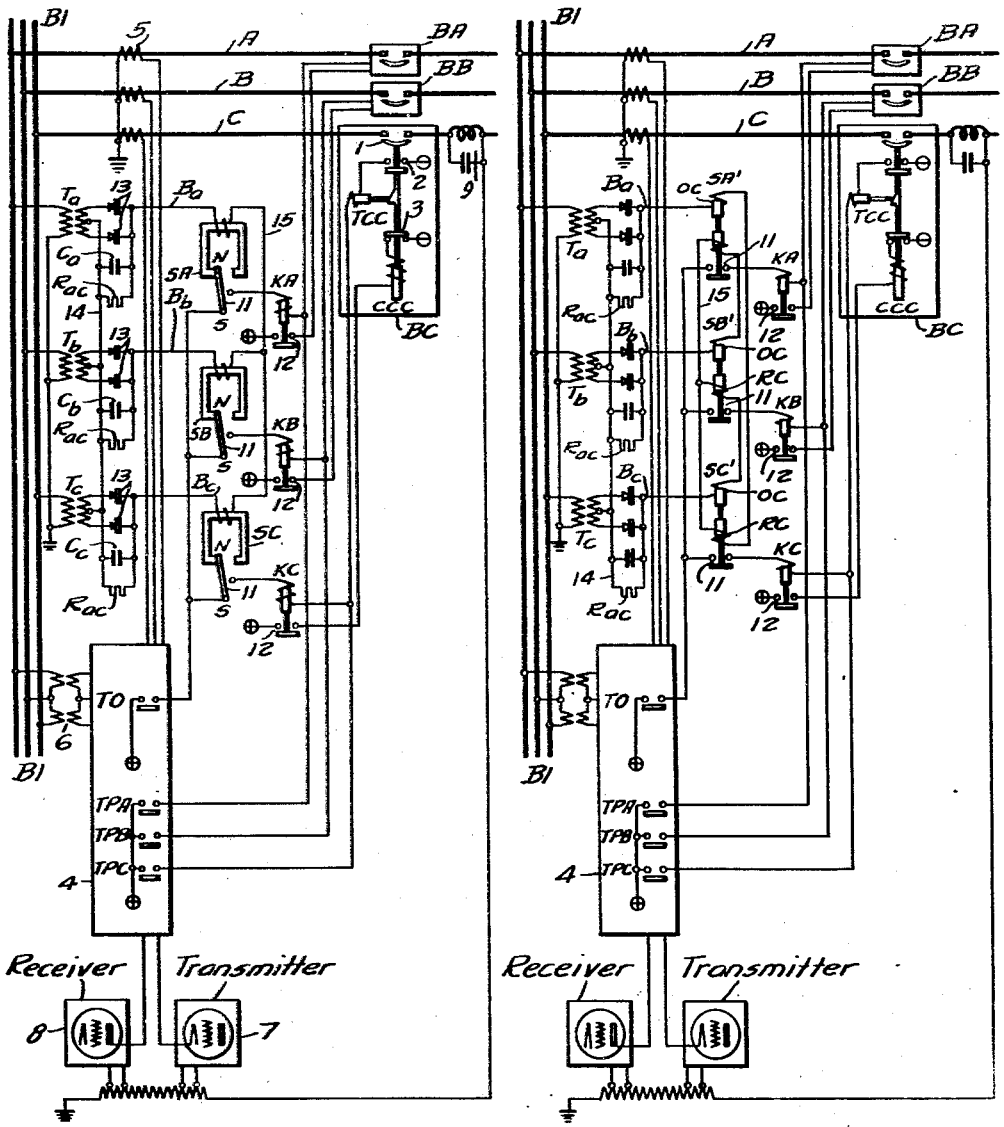

INVENTOR
Edwin L. Harder.
BY O. B. Buchanan
ATTORNEY

Patented Aug. 7, 1945

2,381,282

UNITED STATES PATENT OFFICE 2,381,282

FAULTED-PHASE SELECTOR

Edwin L. Harder, Forest Hills, Pa., assignor to Westinghouse Electric Corporation, East Pittsburgh, Pa., a corporation of Pennsylvania Application October 30, 1942, Serial No. 463,963

16 Claims. (Cl. 175—294)

My invention relates to electrical relaying-means for sensitively detecting which one of three or more electrical quantities is smaller than the others, and more specifically, my invention relates to electrical relaying-means for indicating which one of three line-to-neutral voltages, on a three-phase line, becomes slightly less than either of the other two line-to-neutral voltages.

The principal field of application of my invention, or the most pressing present need for it, arises in connection with single-pole tripping, with reclosing breaker-operation, which is utilized for protecting three-phase transmission systems against faults involving less than all three of the line-conductors, with a minimum loss of load, even during the brief time required to open and reclose a fast circuit breaker, and with a minimum likelihood of loss of synchronism or stability.

Heretofore, the principal difficulty with such single-pole tripping-systems has resided in the provision of a faulted-phase selector having a quickness and sensitivity matching that of a sensitive residual-current ground-fault detector. The most sensitive faulted-phase selector heretofore available for this service has been a device comparing the phases or relative directions of two different phase-sequence quantities, as covered by a Goldsborough application, Serial No. 373,561, filed January 8, 1941, and more fully shown, in the complete protective-relay combination, in a Goldsborough application, Serial No. 424,957, filed December 30, 1941, and involving extensive, and preferably special, phase-sequence network-equipment, as shown, for example, in a Lenehan application, Serial No. 424,937, filed December 30, 1941.

The object of my present invention is to provide a new faulted-phase selector, operating on an entirely different principle, requiring much less apparatus, imposing a very much lower burden on the instrument-transformers, and readily susceptible of being made fully as sensitive and fully as reliable as the previously known faulted-phase selector.

More specifically, an object of my invention is to provide means for comparing three or more unidirectional voltages, and affording an indication of whichever one is less than the average of the other two, regardless of the actual voltages involved, being responsive only to the ratio of the smallest voltage to the average of the other voltages.

A further object of my invention is to provide a means for selecting the smallest of three or more alternating-current voltages by rectifying each of the three voltages, and comparing the magnitudes of the rectified voltages, as just described.

A still further object of my invention is to provide a phase-selecting network comprising, essentially, three or more independently variable sources of unidirectional voltage, connected in three parallel-connected circuits, each circuit being provided with means for responding to the relatively large reverse-current-flow in the circuit containing the source of the lowest voltage.

A further object of my invention is to provide means for limiting the overburdening of the selector-relay when the minimum voltage becomes reduced to a value which is only a very small fraction of the average of the remaining voltages.

Figure 3:
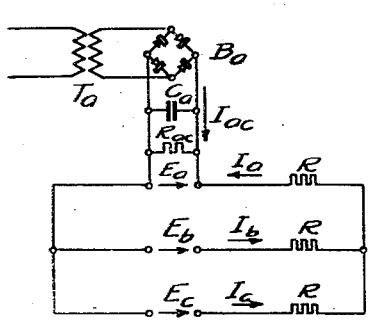

With the foregoing and other objects in view, my invention consists in the parts, structures, apparatus, circuits, combinations, systems, and methods hereinafter described and claimed, and illustrated in the accompanying drawing, wherein Figure 1 is a diagrammatic view of circuits and apparatus illustrating my invention in a preferred form of embodiment, Fig. 2 is a similar view illustrating a modification, and Fig. 3 is an equivalent-circuit diagram which will be referred to in the analysis and explanation of the invention.

In Figure 1, I show my invention in an application involving single-pole breaker-operation for the protection of a three-phase transmission-line or system. As the equipment for each terminal of the line is, or may be, identical, I have shown only one terminal or end of a three-phase line A, B, C, which is connected to a bus B1, through three single-pole breakers BA, BB, BC. Only one of the breakers, namely the phase-C breaker BC, is shown in any detail, and even that breaker is simplified to its barest essentials necessary for describing the invention. It is shown as having main contacts 1, a pair of auxiliary contacts 2 which are open when the breaker is open, a pair of auxiliary contacts 3 which are closed when the breaker is open, a phase-C trip-coil TCC, and a phase-C closing-coil CCC.

The protective relaying equipment for controlling the operation of the three single-pole breakers BA, BB and BC is shown as comprising certain known or conventional parts, which have been grouped in a relaying panel 4, which is diagrammatically indicated as having a plurality of relaying contacts, which are schematically indicated, in each case, as comprising a single contact, although it is to be understood that each contact may represent a plurality of contacts in series with each other for jointly effecting a partial completion of a relaying circuit. The first contact is marked TO, to represent the directional and ground-fault-responsive, or zero-phase-sequence, tripping-contacts for responding to ground-faults on the line. The other contacts are marked TPA, TPB and TPC to similarly represent the directional and phase-fault-responsive tripping-contacts for the respective line-phases A, B and C.

The relaying-panel 4 is shown as being energized from line-current transformers 5 and potential-transformers 6, and also as being coupled to a carrier-current transmitter-and-receiver set, 7 and 8, which is coupled to the line, as shown at 9, for the purpose of enabling the relay to respond to the current-direction at the other end of the line-section, as well as to the conditions which are indicated or determinable at its own end, in a manner which is well known.

The ground-fault tripping-contact TO, which is schematically indicated in the relaying-panel 4, is representative of apparatus which is responsive to zero-sequence currents, and which thus responds to the existence of a fault involving zero-sequence current, that is, a ground-fault, without discrimination as to which of the three phases is affected by the fault. In accordance with my invention, I provide, in series with the contact TO, a set of three phase-selectors SA, SB and SC which are intended to select the faulted phase, and which have their contacts 11 connected in series with the tripping-circuit of the corresponding circuit-breaker.

My illustrated protective-relaying equipment also includes a set of auxiliary contactors or relays KA, KB and KC, one for each phase, having their operating-coils connected in the respective ground-fault-responsive tripping-circuits, and having make-contacts 12 for energizing the closing-coils of the respective circuit-breakers for effecting a reclosing breaker-operation.

The relaying-connections for the phase-C breaker BC may thus be traced, from the positive battery-terminal (+), through the phase-fault tripping-contacts TPC, to the trip-coil TCC, and thence, through the auxiliary breaker-switch 2, to the negative battery-terminal (—). A second energizing-circuit for the same trip-coil TCC may be traced from the positive battery-terminal (+) through the ground-fault tripping-contact TO, the contact 11 of the phase-selector SC, and the operating-coil of the auxiliary contactor KC, and thence to the trip-coil TCC. The closing-coil CCC is shown as being energized simultaneously with the trip-coil TCC, in the event of a ground-fault, this function being accomplished by the contact 12 of the contactor KC, which closes a circuit from the positive battery-terminal (+) to the closing-coil CCC, and thence, through the auxiliary breaker-switch 3, to the negative battery-terminal (—).

In accordance with my invention, the three selector-relays SA, SB and SC are energized with rectified line-to-neutral voltages which are obtained by means of three potential-transformers $T_a$, $T_b$ and $T_c$, the secondary-circuit outputs of which are rectified by means of rectifiers 13. Preferably, also, the resultant rectified voltages are smoothed out, in wave-form, by means of shunt-connected capacitors $C_a$, $C_b$ and $C_c$, respectively, or by any other equivalent ripple-suppressing means. The three resultant rectified voltages are connected in three parallel circuits or branches $B_a$, $B_b$ and $B_c$ respectively, each of these circuits or branches containing, in addition to the source of rectified voltage, the operating-coil of one of the selector-relays SA, SB and SC. Star-point connections 14 and 15 respectively are utilized, for joining together, or paralleling, the ends of the three circuits $B_a$, $B_b$ and $B_c$. The terminals of each of the rectified-voltage sources are joined by a resistor $R_{ac}$, these resistors being necessary, because, during fault-responsive operation of the network, the current in at least one of the three branches $B_a$, $B_b$ or $B_c$ reverses.

Since the terminals of the three rectified-voltage resistors or sources $R_{ac}$ are connected together, in parallel with each other, through the resistances consisting of the operating coils of the several selector-relays SA, SB and SC, it is obvious that, when the three line-voltages $E_a$, $B_b$ and $E_c$ are all equal, no current will be flowing through any one of the three network-branches $B_a$, $B_b$ or $B_c$ of my phase-selector network. Whenever any one of the three rectified voltages becomes smaller than the other two, the two last-mentioned voltages will together feed current back, in the reverse direction, in the circuit containing the low voltage, so that the selector-relay in this low-voltage circuit will be energized with current which is equal, in magnitude, to the sum of the currents flowing in the other two phase-selector operating-coils, and opposite in direction.

In accordance with my invention, I provide any means, in each of the three phase-selector circuits $B_a$, $B_b$, and $B_c$, for responding to these relatively large reverse-currents which flow in the branch-circuit containing the low rectified voltage. This response can obviously be obtained in either one or two ways, either by responding to the direction of current-flow in each of the three branches $B_a$, $B_b$ and $B_c$, or differentially comparing the magnitude of the current-flow in any one of the branches, with the magnitude of the current flowing in either one of the other two branches, or by a combination of both ways. These two alternative means of faulty-phase selection are illustrated in Figs. 1 and 2, respectively, which will now be referred to more in detail.

In Fig. 1, in order that the phase-selector relays SA, SB and SC may be responsive to the direction of the unidirectional current flowing therethrough, so that the relay will respond when the current is flowing in the reverse direction, against the line-derived unidirectional voltage in that branch, and will not respond when the current is flowing in the forward direction, as when the voltage-source in that branch is larger than the voltage-source in some other branch, my phase-selector relays SA, SB and SC are schematically illustrated as polarized relays, connected to respond when the current is flowing from the relay-connected star-connection or network-terminal 15 to the source-connected star-connection or network-terminal 14. This showing is intended to be symbolic of any relay which is responsive to the direction of a unidirectional current.

The system which is shown in Fig. 2 is identical with that which is shown in Fig. 1, except that the three phase-selector relays SA', SB' and SC' are differential relays, each relay having an operating-coil OC which is energized with the current in its own phase or branch $B_a$, $B_b$, or $B_c$, as the case may be, and each relay also having a restraining-coil RC which is energized with the current in one of the other two phases, such as the next lagging phase, although the leading phase could have been chosen equally well.

Since the reverse-current which flows in the phase-selector network-branch $B_a$, $B_b$ or $B_c$ having the lowest line-derived voltage connected therein is always equal to the sum of the forward-currents flowing in the two other network-branches, the reverse-current which flows in the low-voltage branch is always larger than the forward-current which flows in either of the other two branches, except in the case when two of the line-voltages are simultaneously reduced in the same amounts. In such a case, for example if the voltages on phases A and B should be simultaneously reduced in precisely the same amounts, the phase-selector network-current in phase C would supply the reverse-current flowing in both of the phase-A and phase-B branches of the network, and a differential relay comparing the network-currents in phases A and B would not respond at all, while a non-polarized differential relay comparing the phase-C network-current with the network-current in either phase A or phase B would erroneously indicate that phase C is the faulted phase. In such a case, however, the phase-fault relaying equipment, symbolized by the phase-fault tripping-contacts TPA, TPB or TPC, will be affected, and a tripping-operation of the necessary breaker or breakers will be effected by the phase-fault tripping-apparatus, rather than the ground-fault tripping-apparatus.

The operation of my invention will perhaps be more clearly apparent from Fig. 3, which shows the equivalent diagram of the phase-selector network, with the equivalent circuit for the alternating-current circuit and rectification-equipment associated with phase-A. In my discussion, from this point on, I shall always apply the letter-designation A to the faulted phase, the next lagging phase being B, while the leading phase is designated C. If the three rectified line-derived voltages $E_a$, $E_b$ and $E_c$ are not all equal to each other, $E_a$ will always be regarded as the low voltage.

In the diagrammatic representation of Fig. 3, the arrows $E_a$, $E_b$ and $E_c$ represent the voltages appearing across the terminals of the three line-voltage-responsive resistances $R_{ac}$. The resistances which are connected in each of the respective network-branches $B_a$, $B_b$ and $B_c$ are represented at R, in Fig. 3, representing the resistance of the operating-coil of the polarized relay, in Fig. 1, or the combined resistances of the operating-coil OC of one differential relay, and the restraining-coil RC of another differential relay, in Fig. 2. The relative directions and magnitudes of current-flow, for the condition of a voltage-dip in phase-A, are indicated, in Fig. 3, by the three arrows $I_a$, $I_b$ and $I_c$.

Fig. 3 also details the equivalent circuit of the supply-circuit for the low-voltage source $E_a$. Thus, the terminals of the $E_a$ source are shunted by the resistance $R_{ac}$ which derives its energy from the alternating-current line-voltage. The resistance $R_{ac}$ is also shunted by the ripple-suppressing capacitor $C_a$, and is supplied with energy from the rectifier which is symbolically represented, in Fig. 3, by a rectifier-bridge $B_a$, which is, in turn, energized from the phase-A potential-transformer $T_a$. The rectifier-bridge $B_a$, in Fig. 3, is the full equivalent of the rectifier-connection indicated at 13 in the $B_a$ branch, in Fig. 1.

The following relationships are apparent from Fig. 3:

$$I_a = I_b + I_c \quad (1)$$

$$E_a + RI_a = E_b - RI_b = E_c - RI_c = \frac{E_b + E_c - RI_a}{2} \quad (2)$$

If $$E_a = (1-a)\frac{E_b + E_c}{2} \quad (3)$$

$$I_a = \tfrac{2}{3} \cdot \frac{a}{R} \cdot \frac{E_b + E_c}{2} \quad (4)$$

$$E_r = RI_a = \tfrac{2}{3} \cdot a \cdot \frac{E_b + E_c}{2} \quad (5)$$

In order that the voltage $E_a$ across the supply-circuit-energized resistance $R_{ac}$ may be dependent upon the alternating-current voltage of the potential-transformer $T_a$, regardless of the network-current $I_a$, it is necessary that the network-current $I_a$ shall be less than the alternating-source-supplied current $I_{ac}$. Thus $$I_a < I_{ac} \quad (6)$$

whence $$\frac{2a}{3R} \cdot \frac{E_b + E_c}{2} < \frac{1-a}{R_{ac}} \cdot \frac{E_b + E_c}{2} \quad (7)$$

This imposes a maximum limit on the voltage-dip quantity $a$, above which the relay-voltage will no longer be controlled by $E_a$. This maximum voltage-dip limit of $a$ may be designated, $$a_{max} = \frac{1}{1 + \frac{2R_{ac}}{3R}} \quad (8)$$

At this limiting value of $$E_a = (1 - a_{max})\frac{E_b + E_c}{2}$$

the relay-voltage $E_r'$ becomes $$E_r' = \tfrac{2}{3} \cdot \frac{1}{1 + \frac{2R_{ac}}{3R}} \cdot \frac{E_b + E_c}{2} \quad (9)$$

and if $I_a$ dips any further, the relay-voltage does not increase any more, but thereafter remains constant at the value of $E_r'$ shown by Equation 9.

This provides a means for preventing an excessive voltage-rise on a faulted-phase-selecting relay which is made sensitive enough to respond when $E_a$ drops only slightly below the average of $E_b$ and $E_c$, on a line in which occasionally $E_a$ may drop to a value which is very much below $$\frac{E_b + E_c}{2}$$

Thus, if the relay is set to respond sensitively, when $E_a$ drops to, say, 98% of the quantity $$\frac{E_b + E_c}{2}$$

under certain fault-conditions, or $a = 0.02$, $E_a$ being smaller than either $E_b$ or $E_c$, the ratio of the resistances R and $R_{ac}$ may be chosen so as to limit the relay-voltage to any desired maximum value, say twice its pick-up voltage, whereas, without this limitation, a voltage-dip of $E_a$ to 10% of $$\frac{E_b + E_c}{2}$$

or $a = 0.90$, would have subjected the relay to a voltage 45 times as large as its pick-up voltage, if the quantity $$\frac{E_b + E_c}{2}$$

were the same in both cases. Thus, putting $a_{max}=0.04$ in Equation 8, we find the resistance-ratio for this condition to be $$\frac{R_{ac}}{R} = 36$$

While I have described my invention in a preferred form or forms, and while I have illustrated it in a preferred application or use, I wish it to be understood that I am not limited to such description or illustration or showing, as the broader principles of my invention are generic in nature, and susceptible of many different uses or applications. I desire, therefore, that the appended claims shall be accorded the broadest construction consistent with their language.

I claim as my invention:

1. Means for indicating which one of three or more sources of unidirectional voltages has the lowest voltage, comprising a plurality of parallel-connected branch-circuits, one for each source, each branch-circuit including, in series with its source, a current-responsive selector means for selecting the branch-circuit which provides the return-current path for the combined currents of the other branch-circuits.

2. Means for indicating which one of three or more of unidirectional voltages has the lowest voltage, comprising a plurality of parallel-connected branch-circuits, one for each source, each branch-circuit including, in series with its source, a directional current-responsive selector-means for responding to the reverse-current direction of current-flow in its branch-circuit in a direction opposed to the voltage of its source.

3. Means for indicating which one of three or more sources of unidirectional voltages has the lowest voltage, comprising a plurality of parallel-connected branch-circuits, one for each source, each branch-circuit including, in series with its source, a differential current-responsive selector-means and diverse energizing-means for causing said selector-means to respond when the magnitude of the current in its branch-circuit is predeterminedly larger than the magnitude of the current in one of the other branch-circuits.

4. The invention as defined in claim 1, characterized by each source comprising a resistor connected in its branch-circuit, a supply-circuit connected across the resistor, a source of control-current for said supply-circuit, and unidirectional conductor-means in the supply-circuit for permitting current-flow in substantially only one direction, the ratio of the resistor of each source to the resistance of the rest of its branch-circuit being such as to limit the magnitude of the reverse-current-flow in a branch-circuit containing a source having a voltage which is very much lower than the voltage of some other source.

5. The invention as defined in claim 2, characterized by each source comprising a resistor connected in its branch-circuit, a supply-circuit connected across the resistor, a source of control-current for said supply-circuit, and unidirectional conductor-means in the supply-circuit for permitting current-flow in substantially only one direction, the ratio of the resistor of each source to the resistance of the rest of its branch-circuit being such as to limit the magnitude of the reverse-current-flow in a branch-circuit containing a source having a voltage which is very much lower than the voltage of some other source.

6. The invention as defined in claim 3, characterized by each source comprising a resistor connected in its branch-circuit, a supply-circuit connected across the resistor, a source of control-current for said supply-circuit, and unidirectional conductor-means in the supply-circuit for permitting current-flow in substantially only one direction, the ratio of the resistor of each source to the resistance of the rest of its branch-circuit being such as to limit the magnitude of the reverse-current-flow in a branch-circuit containing a source having a voltage which is very much lower than the voltage of some other source.

7. The combination, with a polyphase line, of means for deriving a polyphase electrical quantity from the line, rectifying-means for separately rectifying each phase of the derived polyphase electrical quantity, a resistor connected to be energized with rectified current from each phase of the derived polyphase electrical quantity, and electrical relaying-means for detecting which one of the phases of said polyphase line-quantity is smaller than another of said phases, said relaying-means comprising a plurality of branch-circuits, one for each of said rectified-current energized resistors, said branch-circuits being interconnected in parallel-circuit relation, each branch-circuit including, in series with its rectified-current-energized resistor, a current-responsive selector-means for selecting the branch-circuit which provides the return-current path for the combined currents of the other branch-circuits.

8. The combination, with a polyphase line, of means for deriving a polyphase electrical quantity from the line, rectifying-means for separately rectifying each phase of the derived polyphase electrical quantity, a resistor connected to be energized with rectified current from each phase of the derived polyphase electrical quantity, and electrical relaying means for detecting which one of the phases of said polyphase line-quantity is smaller than another of said phases, said relaying-means comprising a plurality of branch-circuits, one for each of said rectified-current-energized resistors, said branch-circuits being interconnected in parallel-circuit relation, each branch-circuit including, in series with its rectified-current-energized resistor, a directional current-responsive selector-means for responding to the reverse-current direction of current-flow in its branch-circuit in a direction opposed to the voltage of its source.

9. The combination, with a polyphase line, of means for deriving a polyphase electrical quantity from the line, rectifying-means for separately rectifying each phase of the derived polyphase electrical quantity, a resistor connected to be energized with rectified current from each phase of the derived polyphase electrical quantity, and electrical relaying means for detecting which one of the phases of said polyphase line-quantity is smaller than another of said phases, said relaying-means comprising a plurality of branch-circuits, one for each of said rectified-current-energized resistors, said branch-circuits being interconnected in parallel-circuit relation, each branch-circuit including, in series with its rectified-current-energized resistor, a differential current-responsive selector-means and diverse energizing-means for causing said selector-means to respond when the magnitude of the current in its branch-circuit is predeterminedly larger than the magnitude of the current in one of the other branch-circuits.

10. Electrical relaying-means for indicating which one of three line-to-neutral voltages of a three-phase line becomes slightly less than either of the other two line-to-neutral voltages, comprising, in combination with the three-phase line: means for deriving the three line-to-neutral line-voltages, rectifying-means for separately rectifying each of the three derived line-to-neutral voltages, a resistor connected to be energized with rectified current from each of the three derived line-to-neutral voltages, and a plurality of branch-circuits, one for each of said rectified-current-energized resistors, said branch-circuits being interconnected in parallel-circuit relation, each branch-circuit including, in series with its rectified-current-energized resistor, a current-responsive selector-means for selecting the branch-circuit which provides the return-current path for the combined currents of the other branch-circuits, the ratio of each of the rectified-current-energized resistors to the resistance of the rest of its branch-circuit being such as to limit the magnitude of the reverse-current-flow in the branch-circuit of a line-to-neutral voltage which becomes very much less than the average of the other two line-to-neutral voltages.

11. Electrical relaying-means for indicating which one of three line-to-neutral voltages of a three-phase line becomes slightly less than another of the line-to-neutral voltages, comprising, in combination with the three-phase line: means for deriving the three line-to-neutral line-voltages, rectifying-means for separately rectifying each of the three derived line-to-neutral voltages, a resistor connected to be energized with rectified current from each of the three derived line-to-neutral voltages, and a plurality of branch-circuits, one for each of said rectified-current-energized resistors, said branch-circuits being interconnected in parallel-circuit relation, each branch-circuit including, in series with its rectified-current-energized resistor, a directional current-responsive selector-means for responding to the reverse-current direction of current-flow in its branch-circuit in a direction opposed to the voltage of its source, the ratio of each of the rectified-current-energized resistors to the resistance of the rest of its branch-circuit being such as to limit the magnitude of the reverse-current-flow in the branch-circuit of a line-to-neutral voltage which becomes very much less than another of the line-to-neutral voltages.

12. Electrical relaying-means for indicating which one of three line-to-neutral voltages of a three-phase line becomes slightly less than either of the other two line-to-neutral voltages, comprising, in combination with the three-phase line: means for deriving the three line-to-neutral line-voltages, rectifying-means for separately rectifying each of the three derived line-to-neutral voltages, a resistor connected to be energized with rectified current from each of the three derived line-to-neutral voltages, and a plurality of branch-circuits, one for each of said rectified-current-energized resistors, said branch-circuits being interconnected in parallel-circuit relation, each branch-circuit including, in series with its rectified-current-energized resistor, a differential current-responsive selector-means and diverse energizing-means for causing said selector-means to respond when the magnitude of the current in its branch-circuit is predeterminedly larger than the magnitude of the current in one of the other branch-circuits, the ratio of each of the rectified-current-energized resistors to the resistance of the rest of its branch-circuit being such as to limit the magnitude of the reverse-current-flow in the branch-circuit of a line-to-neutral voltage which becomes very much less than the average of the other two line-to-neutral voltages.

13. A single-pole breaker-operating protective-relaying system for protecting a three-phase line against ground-faults: comprising, in combination with the line and the three single-pole breakers at one end of the line: directional and ground-fault-responsive tripping-contact relaying-means for responding to the existence of a fault involving zero-sequence current, selector-means energized responsively to the line-voltages for determining which one of the three line-to-neutral line-voltages becomes less than either of the other two line-to-neutral line-voltages, and means jointly responsive to the tripping-contact relaying-means and the selector-means for opening and reclosing the selected one of the single-pole breakers.

14. The invention as defined in claim 13, characterized by said selector-means comprising means for deriving the three line-to-neutral line-voltages, rectifying-means for separately rectifying each of the three derived line-to-neutral voltages, a resistor connected to be energized with rectified current from each of the three derived line-to-neutral voltages, and a plurality of branch-circuits, one for each of said rectified-current-energized resistors, each branch-circuit including, in series with its rectified-current-energized resistor, a sensitive current-responsive selector-means for selecting the branch-circuit which provides the return-current path for the combined currents of the other branch-circuits, the ratio of each of the rectified-current-energized resistors to the resistance of the rest of its branch-circuit being such as to limit the magnitude of the reverse-current-flow in the branch-circuit of a line-to-neutral voltage which becomes very much less than the average of the other two line-to-neutral voltages.

15. The invention as defined in claim 13, characterized by said selector-means comprising means for deriving the three line-to-neutral line-voltages, rectifying-means for separately rectifying each of the three derived line-to-neutral voltages, a resistor connected to be energized with rectified current from each of the three derived line-to-neutral voltages, and a plurality of branch-circuits, one for each of said rectified-current-energized resistors, each branch circuit including, in series with its rectified-current-energized resistor, a sensitive directional current-responsive selector-means for responding to the reverse-current direction of current-flow in its branch-circuit in a direction opposed to the voltage of its source, the ratio of each of the rectified-current-energized resistors to the resistance of the rest of its branch-circuit being such as to limit the magnitude of the reverse-current-flow in the branch-circuit of a line-to-neutral voltage which becomes very much less than the average of the other two line-to-neutral voltages.

16. The invention as defined in claim 13, characterized by said selector-means comprising means for deriving the three line-to-neutral line-voltages, rectifying-means for separately rectifying each of the three derived line-to-neutral voltages, a resistor connected to be energized with rectified current from each of the three derived line-to-neutral voltages, and a plurality of branch-circuits, one for each of said rectified-current-energized resistors, each branch-circuit including, in series with its rectified-current-energized resistor, a sensitive, differential current-responsive selector-means and diverse energizing-means for causing said selector-means to respond when the magnitude of the current in its branch-circuit is predeterminedly larger than the magnitude of the current in one of the other branch-circuits, the ratio of each of the rectified-current-energized resistors to the resistance of the rest of its branch-circuit being such as to limit the magnitude of the reverse-current-flow in the branch-circuit of a line-to-neutral voltage which becomes very much less than the average of the other two line-to-neutral voltages.

EDWIN L. HARDER.